C. J. FANCHER.
FEEDING MECHANISM.
APPLICATION FILED JUNE 21, 1911.

1,115,916.

Patented Nov. 3, 1914.
5 SHEETS—SHEET 1.

WITNESSES:
A. C. Fairbanks.
J. M. Davenport.

INVENTOR.
Charles J. Fancher,
Webster & Co.,
ATTORNEYS.

C. J. FANCHER.
FEEDING MECHANISM.
APPLICATION FILED JUNE 21, 1911.

1,115,916.

Patented Nov. 3, 1914.

WITNESSES:
A. C. Fairbanks.
J. M. Davenport.

INVENTOR.
Charles J. Fancher,
BY Webster & Co.,
ATTORNEYS.

C. J. FANCHER.
FEEDING MECHANISM.
APPLICATION FILED JUNE 21, 1911.

1,115,916.

Patented Nov. 3, 1914.
6 SHEETS—SHEET 3.

WITNESSES:
A. C. Fairbanks.
J. M. Davenport.

INVENTOR.
Charles J. Fancher,
BY Webster & Co.,
ATTORNEYS.

C. J. FANCHER.
FEEDING MECHANISM.
APPLICATION FILED JUNE 21, 1911.

1,115,916.

Patented Nov. 3, 1914.
5 SHEETS—SHEET 4.

WITNESSES:
A. C. Fairbanks.
J. M. Davenport.

INVENTOR.
Charles J. Fancher,
BY
Webster & Co.,
ATTORNEYS

UNITED STATES PATENT OFFICE.

CHARLES J. FANCHER, OF THOMPSONVILLE, CONNECTICUT, ASSIGNOR TO THE EXTENSIVE MANUFACTURING COMPANY, OF NEW YORK, N. Y., A CORPORATION OF NEW YORK.

FEEDING MECHANISM.

1,115,916.  Specification of Letters Patent.  Patented Nov. 3, 1914.

Application filed June 21, 1911. Serial No. 634,395.

*To all whom it may concern:*

Be it known that I, CHARLES J. FANCHER, a citizen of the United States of America, residing at Thompsonville, in the county of Hartford and State of Connecticut, have invented a new and useful Feeding Mechanism, of which the following is a specification.

My invention relates to improvements in mechanism for feeding flexible units connected together in the form of strips, which mechanism is particularly adapted to be applied to or incorporated with or in devices or machines for automatically affixing such units to objects or articles, and more especially for handling postage stamps for the purpose of affixing them to envelops and other wrappers for mail matter, and said invention consists of certain peculiar parts and combinations of parts, all as hereinafter set forth.

The objects of my invention are, first, to produce compact and convenient mechanism which is capable of expeditiously handling units such as stamps, from a roll mounted in the machine which comprises such mechanism, without mutilating the units or stamps or failing to deliver them properly; second, to provide such mechanism with accurate means for counting the units or stamps as they are fed; third, to prevent false movements on the part of the mechanism as a whole, and so to protect the units or stamps handled by such mechanism, by furnishing locking and releasing means for the plunger, whereby the latter is prevented from returning or retrograding in either direction, after being started, until the full stroke is completed, and, fourth, to afford means for easily and quickly loading the machine, so to speak, whereby a roll of units or stamps is placed in position and the leading units or stamps from such roll are introduced into what may be termed the feed mechanism in proper readiness for the commencement of the automatic action what may be termed the transfer mechanism. By means of this mechanism a strip of units or stamps from a roll is advanced, and the foremost unit or stamp of such strip is moistened, severed and transferred to affixing position at each downward stroke of the operating plunger, and a record of such unit or stamp is made at the same time and by the same operation.

Other objects and advantages will appear in the course of the following description.

A preferred form of embodiment of the invention, whereby I attain the objects and secure the advantages of the same, is illustrated in the accompanying drawings, and I will proceed to describe the invention with relation to the latter, although it is to be understood that the form, construction, arrangement, etc., of the parts and members in various aspects are not material and may be modified without departure from the spirit of the invention.

In the embodiment of the invention as herein illustrated I have represented the same in connection with or as applied to or forming a part of a machine for affixing postage stamps to envelops and other wrappers for mail matter, and I will describe it as thus illustrated, without, however, limiting myself in any way to such application, since the subject matter of this application in whole or in part is adapted for other purposes and may be put to other uses, as before intimated. The moistening and affixing elements of the present embodiment of my invention are not herein claimed, inasmuch as the stamp affixer *per se* and such elements form the subject matter of another application filed by me in the United States Patent Office and which is a divisional part of this application.

In the drawings, in which similar figures refer to similar parts throughout the several views, Fig. 8, a rear end elevation of the affixer, the door being open; Fig. 9, an enlarged top plan of the stamp-feed and part of the counter-releasing mechanism.

The machine comprises a suitable supporting frame preferably in the form of a case and a plunger which extends above and has its active or operative end inside of the same, and mechanism for feeding and handling the stamps within such case. The aforesaid mechanism naturally comes under three general heads or sub-divisions, namely the stamp-feed and counter-releasing devices which are so combined that they form practically one group of intimately related parts, the stamp-transfer devices, and the stamp-presser devices, the latter not being claimed herein. Included with the stamp-transfer devices is the counter-operating mechanism.

The combined feeding and counter-releasing mechanism is indirectly operated by the plunger, excepting when the stamps are initially introduced into such mechanism, an independent and direct manual action on the part of the operator then being required, while the transferring, counting, and pressing mechanisms are directly operated by said plunger. The case is equipped with means for holding the roll of stamps and for conveniently placing such roll in position, and a lock or check is provided for the plunger. There is also a suitable moistening device within the case, which is included in claims in the divisional application. I will now take up in detail the several divisions of the machine and the several parts and members of such divisions, beginning with the case, but before doing so wish to observe that, for the sake of convenience in describing the affixer and its operation, it will be assumed that the terms front and back, or equivalent expressions, as applied to the affixer longitudinally, refer respectively to the left-hand and right-hand ends of the machine as it stands in Figs. 1, 2, 17 and 19, and that the same or equivalent terms or expressions as applied to said affixer transversely, refer respectively to the side of the machine which is nearer the observer in said views and to the opposite side thereof. This assumption in most cases holds in regard to the several parts and members of the machine as well as to the machine as a whole.

The case, herein illustrated, is made up of a front end piece 1, a top piece 2 and a partition piece 3, all integral, front and back plates or side pieces 4 and 5, respectively, which are suitably secured to the lateral edges of said end and top pieces, and a flanged door 6 hinged or pivoted at the top to the rear end of said top piece 2, as shown at 7. The partition 3 extends downward from the top 2 about midway between the ends thereof and curves rearwardly to form with the back portion of said top, which curves upwardly and rearwardly, and the upper part of the door 6, when said door is closed, which upper part curves upwardly and forwardly, and with the side pieces 4 and 5, a compartment or chamber 8 for the stamp roll. The rest of the interior of the case is open and contains practically all of the operating parts and members, such open space being represented at 9. The space or compartment 9 is not only in front of the partition 3, but also extends below it and communicates with the stamp-roll chamber 8 behind the bottom edge of said partition.

Figures 1, 3:
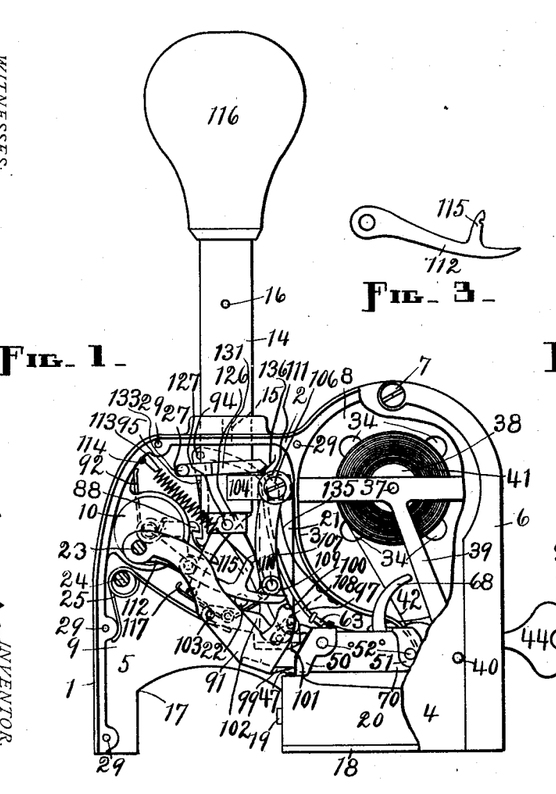
Figure 1 is a side elevation of a stamp affixer in which is embodied the aforesaid form of my invention, the major portion of the front side plate being broken away and the several parts and members being normally or initially disposed.
Fig. 3, a side elevation of the lifter arm for the upper jaw.
Figures 2, 4:
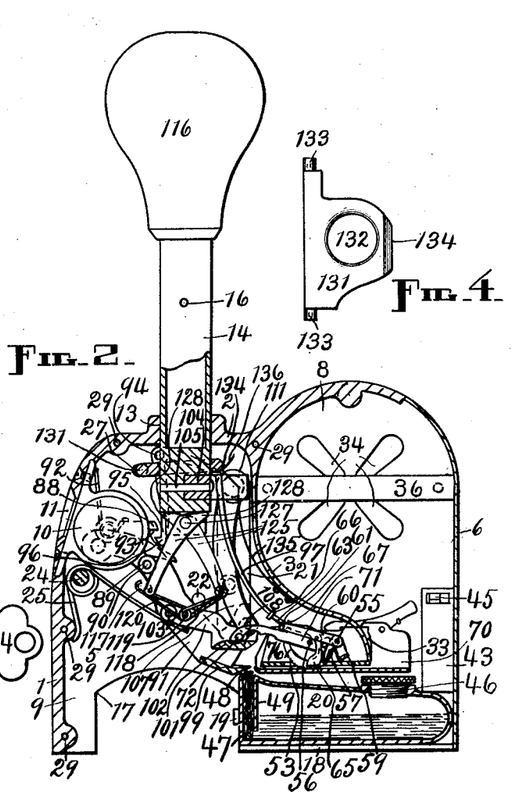
Fig. 2, a longitudinal vertical section through said affixer, with the mechanism disposed as in the first view, the line of cleavage being approximately in the center.
Fig. 4, a top plan of the plunger lock.

A counter 10, of any usual and suitable variety, is fastened against the inside of the front end 1, and there is a slot 11, Fig. 2, in such end of sufficient size to enable the figures of said counter to be seen from outside of the case. The counter 10 has a shaft 12 for operating the counter mechanism, as is customary in devices of this kind, and said shaft protrudes beyond the back end of said counter.

In the top 2, forward of the position of the partition 3, is a hole or opening 13 for a plunger 14 which extends through and operates up and down in said opening. In the front wall of the opening 13 is a vertical slot 15 to admit of the passage of a stud, screw, or other form of projecting member, 16, set in the front of the plunger 14.

Each side piece, 4 and 5, is cut away at 17 to give access laterally to the lower portions of the transfer and presser mechanisms, especially when depressed, and has an inwardly-extending horizontal base piece 18 at the bottom behind said cut-away place or opening 17, and a lug 19 which extends inwardly from the rear edge of said opening. A water tank or reservoir 20 is received on the base pieces 18, and when slid forward thereon encounters the lugs 19, which, with the door 6 when closed, hold said reservoir against endwise movement. The reservoir 20 fits snugly between the side pieces 4 and 5 and so has no lateral movement. The base pieces 18 do not come together, consequently there is a space left between them, as shown in Fig. 8, which makes it convenient to insert the reservoir 20 after being filled and to withdraw it for refilling. There is a vertical slot 21 in each side piece intermediate of the ends of the same, the two slots being oppositely disposed relative to each other, and the side pieces are provided on the inside with oppositely-disposed pins or stops 22 located in front of said slots, and with oppositely-disposed studs 23 located near the front edges of said side pieces. A rod 24, for a spring 25, is located below the studs 23, each end of said rod being received in an opening 26 in one of the side pieces. There is a short horizontal slot or elongated opening 27 in each side piece near the upper front corner thereof, and there is also a rectangular opening 28 in each side piece adjacent to the back edge thereof. Two sets of openings 29 are formed in the two side pieces adjacent to their front and upper edges, and in the side edges of the members 1 and 2, also, for screws 30 by means of which said side pieces are attached to said members 1 and 2, and two pairs of openings 31 are formed in the side pieces, in the rear of the slots 21, for screws 32 by means of which a hanger 33 is attached to and supported between the side pieces. In the upper rear portions of the side pieces are suitable sight openings 34 through which to view the supply of stamps. At 35 appears an opening in each side piece for one of the door pivot screws 7.

Upon referring to Fig. 8, it will be seen that the lower part of the partition 3 is narrowed to accommodate the sides of the hanger 33.

Offset from the rear side piece 5 is a fixed horizontal bar 36. This bar is located at the rear end of a stud 37 and a roller 38 mounted on said stud, when the two latter are thrown up into normal position. The stud 37 extends rearwardly or inwardly from the head of a T-shaped arm 39 which has its base pivoted at 40 to the front side 41, Fig. 1, which is slipped onto said roller piece 4. The roller 38 is for a stamp roll when the arm 39 is turned down on its pivot 40 into the position shown in Fig. 7. After the stamp roll 41 has been mounted on the roller 38 and the strip therefrom introduced into the feed mechanism, the arm 39 is turned upward on the pivot 40 and thrown forward until the front end of its head comes to rest against the partition 3. The stamp roll 41 is now supported loosely on the stud 37, in the chamber 8 between the bar 36 and the head of the arm 39, in readiness for further unwinding. The arm 39 is offset inwardly from the base so as to locate the stamp roll in the center of the space between the plates 4 and 5. The bar 36 and the head of the arm 39 confine the ends of the stamp roll and cause the stamp strip to unwind evenly. A portion of the unwound strip appears at 42, in Figs. 1 and 18.

It may be noted here that the roll 41 consists of a perforated strip of stamps wound with the adhesive surface inside, as supplied by the Post Office Department.

The door 6 is provided with a lock and key, respectively represented at 43 and 44, of any suitable construction. This lock has two bolts 45 to receive which the plate openings 28 are provided. Upon unlocking and opening the door, free access is had to the stamp-roll arm 39, and certain other parts yet to be described become accessible, and the reservoir 20 can be removed and replaced, but when said door is closed and locked these parts and members are shut in and tampering with the stamps is prevented.

The reservoir 20, which is designed to hold water and has a filling-hole normally closed by a screw-cap 46, is provided at its front end with an interior moistener 47 in the form of a wick or equivalent member, such moistener projecting through a slot 48 in the top of said reservoir adjacent to and parallel with the front end thereof. The moistener 47 extends upwardly between the sides of the reservoir and between the front end thereof and a vertical member 49 within the same through the slot 48, to project a little above the edges of the latter. The member 49 extends from the top to within a short distance of the floor of the reservoir 20.

I will next describe the mechanisms for feeding forward the stamp strip 42, and for releasing the counter for the stamps in the strip so fed, the two mechanisms being so closely united or so intimately and closely related and connected as to constitute practically a single mechanism, as previously intimated.

Figure 11:
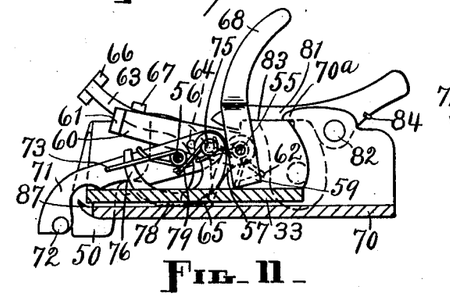
Fig. 11, an enlarged front side elevation of said stamp-feed and associated mechanism, the front sides of the tray and hanger being broken away at their base lines.
Figure 12:
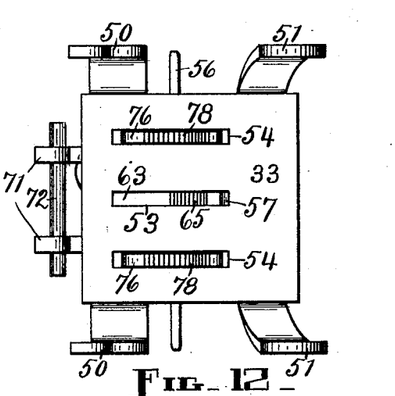
Fig. 12, an enlarged bottom plan of the hanger and parts of the mechanism supported thereby or mounted therein.

The hanger 33, which forms a part of the mechanism now being considered, is an open-ended trough-like structure provided with two pairs of overhanging ears 50 and 51 that contact with the plates 4 and 5 and are secured to said plates by the screws 32, there being openings 52 in said ears to correspond with the plate openings 31, and there being four of such screws, two on a side. The ears 50 and 51 spring from the upper edges of the sides of the hanger and extend outwardly and downwardly so as to leave spaces between them and said sides. In the bottom of the hanger 33 are a central longitudinal slot 53 and two parallel flanking slots 54. Mounted crosswise of the hanger 33 in the sides thereof are two rods or spindles 55 and 56, the latter being in advance of the former and having protruding terminals which prevent said spindle 56 from getting out of place, owing to the nearness of the plates 4 and 5, and also serve another purpose as will appear presently. Mounted loosely on the spindle 55 in the center thereof is a back-stop finger 57 which has a sharp lower terminal that projects through and below the hanger slot 53. The finger 57 is pressed downwardly and rearwardly by means of a spring 58 coiled around the spindle 55 and bearing at one end on the front edge of said finger and at the other end on the rear edge of a lifter 59. Loose on the spindle 55 in front of the finger 57 is a counter-releasing foot-return arm 60. The arm 60 extends to the left from the spindle 55 and has a forwardly-extending lug 61 at its front end. The arm 60 is borne downward by means of a spring 62 coiled around the spindle 55 and bearing at one end on the upper edge of said arm and at the other end on the aforesaid rear edge of the lifter 59. A counter-releasing foot 63 is pivoted at 64 against the back side of the arm 60 in line with the finger 57. This counter-releasing foot has a serrated part, best shown at 65 in Fig. 15, that extends below the pivot 64 through and below the slot 53, and a socket 66 at the forward or left-hand terminal, and there is also a forwardly-extending lug 67 on said foot between said pivot and said socket. The lifter 59 is a horizontal member having upwardly-projecting end pieces which are loosely mounted on the spindle 55 and one of which, the front one, is extended above such spindle to form a handle 68. The handle 68 is partly behind the partition 3 and is offset so as not to interfere with the arm 39. Thus it is seen that said handle is easily accessible when the door 6 is open. A spiral-spring 69, stronger than the springs 58 and 62 combined, is wound on the spindle 55 and arranged with one end bearing beneath the spindle 56 and the other end on the front edge of the lifter, with the result that said lifter is held normally by said spring 69, in the position shown in Fig. 11, with the front edge of the bottom of said lifter against the floor of the hanger 33. The lifter 59 is so constructed and mounted that its rear edge clears the floor of the hanger when said lifter is swung forward.

Figure 15:
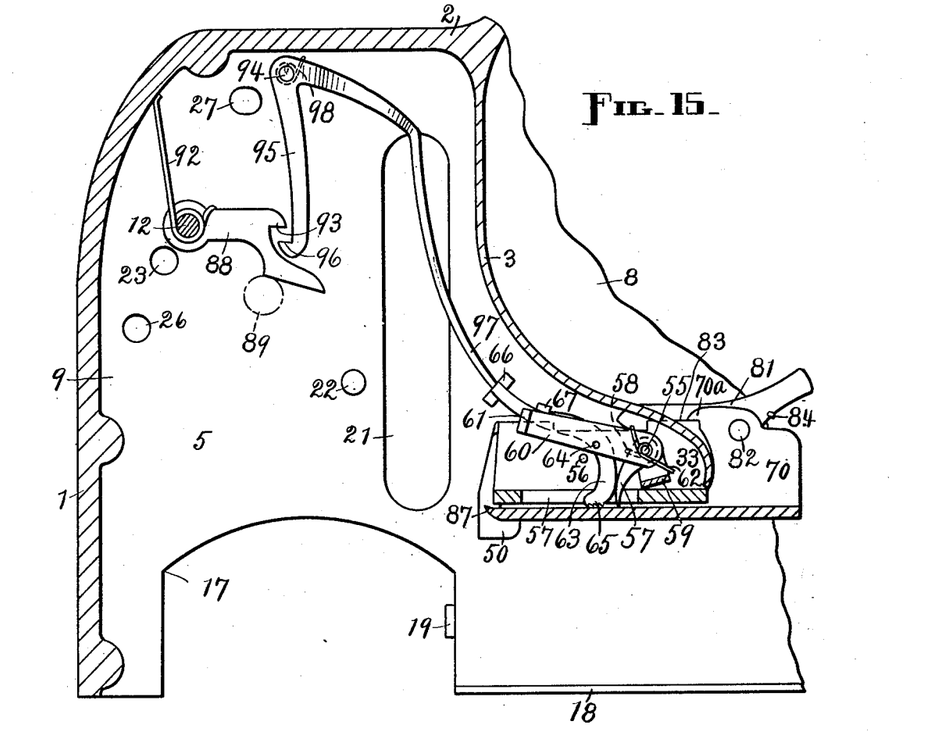
Fig. 15, an enlarged detail, in partial section, showing the counter-operating arm and the releasing mechanism therefor.

Excepting when otherwise supported, the arm 60 rests, under the influence of the spring 62, on the pivotally-attached counter-releasing foot 63 and the latter rests on a tray 70, as appears in Fig. 15. The arm 60 is beneath the lug 67 and the downward movement of the socket terminal of the foot 63 is limited by said lug and arm.

A stamp-feed-operating member and resetter for the counter-releasing foot 63, comprising two arms 71 which are rigidly connected at their left-hand ends by means of a rod 72, is mounted on the spindle 56, the latter passing through such arms in advance or to the left of their right-hand ends. The construction and arrangement of parts are such that the rod 72 is in operative position relative to the exposed upper end of the moistener 47. The aforesaid stamp-feed-operating member is forced downward by means of springs 73—73 coiled around the spindle 56 and bearing with opposite ends respectively on the upper edges of the arms 71 and beneath pins 74—74 that project inwardly from the sides of the hanger 33. When released to the springs 73, the arms 71 retain the rod 72 on the moistener 47. Pins 75—75 project laterally from the right-hand ends of the arms 71, and loosely mounted at their rear ends on these pins outside of said arms are two generally arcuate stamp-feed jaws 76. The jaws 76 have inwardly directed lugs 77—77 on their front terminals which lugs extend above the arms 71, and the bottom edges of said jaws are serrated, as shown at 78. The serrated portions of the jaws 76 extend into and through the slots 54 and bear on the tray 70, excepting at such times as they are withdrawn from such position. The jaws 76 are forced downward and rearward by means of springs 79—79 coiled on the pins 75 and bearing with opposite ends respectively on the edges of said jaws, which are directly in front and below the horizontal plane of said pins, and beneath the coils of the springs 73 on the spindle 56. The serrations or teeth 78 have their sharp edges directed to the left, while the serrations or teeth 65 have their sharp edges directed to the right, the reason for which will appear directly. The lug 61 extends over the front arm 71 to enable the arm 60 to be raised by said arm 71.

Figure 10:
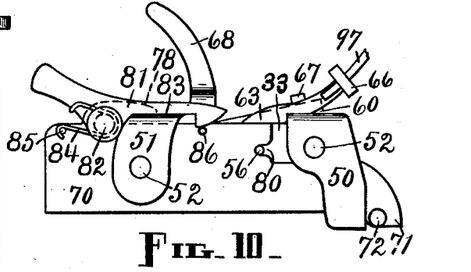
Fig. 10, an enlarged back side elevation of the hanger, which affords a support for the mechanism shown in the preceding view, and of the stamp guide or tray, showing particularly the means for locking and releasing said tray to and from said hanger.

The tray 70, like the hanger 33, is an open-ended trough, and it is adapted with its sides to fit the sides of said hanger inside of the ears 50 and 51, and to be so attached to said hanger that there is a space left between the floors of the two members, as can be seen plainly in Figs. 2, 8, 11, 15 and 16. The trough 70 is supported from the hanger 33 by means of the protruding terminals of the spindle 56, each of which is received into a notch 80 opening through the front edge of one of the sides of said tray, and a forwardly-projecting hook 70a formed on the upper edge of the back side of the tray and arranged to fit over the top of the ear 51 that springs from the back side of the hanger. A latch 81 is also provided to engage the aforesaid ear. The latch 81 is pivoted at 82 against the back of the rear side of the tray 70 and extends both ways, the forward part being recessed, as shown at 83, in Fig. 10, to fit over the top of the ear 51 just referred to, and the rear part having an upward inclination to form a handle. A spring 84 is coiled on the pivot 82 and bears with one terminal against the underside of the latch handle and with the other terminal on a pin 85 which is set in the tray behind said pivot. The spring 84 normally forces the recessed portion of the latch 81 downward, and a pin 86 is located on the back side of the tray 70 beneath the latch hook to prevent said recessed portion from rocking downward below a point where it cannot be readily forced over the ear 51 which it engages when said tray is pushed into place. In attaching the tray to the hanger, said tray is brought into alinement with said hanger at the rear end of the latter and pushed forward until the notched parts at 80 and the hook 70a respectively engage the protruding ends of the spindle 56 and the ear 51 which is in operative relation to said hook, and the latch 81 snaps over said ear. Said ear is now in the recess 83 which it fits and so prevents the tray from moving longitudinally, and at the same time said ear supports the rear end of said tray through the medium of the hook 70a. The spindle 56 supports the front end of the tray as explained.

To remove the tray 70, when the door 6 is open, depress the handle of the latch 81, which handle projects into the chamber 8, and withdraw said tray from the hanger 33. This removal of the tray is necessary in case it is desired for any reason to gain access to the stamp-engaging members that project through the slots 53 and 54, or to remove any obstruction that may possibly get into the space between the floors of the hanger and tray. The tray is returned to position in the same manner as before.

Figure 20:
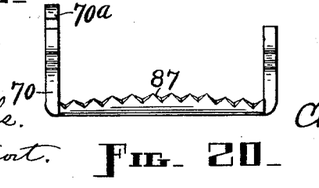

The floor of the tray 70 is turned up slightly and serrated at the front end, and this serrated edge is bowed so that the middle serrations are above the horizontal plane of the serrations both sides thereof, as represented at 87. The bowed or arcuate arrangement of the serrations is plainly shown in Fig. 20. By thus serrating the front end of the tray floor and raising the serrated edge in the center, I provide unfailing means for catching and holding the stamps at the time they are torn apart. This means is certain because some of the teeth are sure to enter the perforations between the stamps, which might not be the case if the serrated edge were straight.

Figures 3, 5, 6, 7:
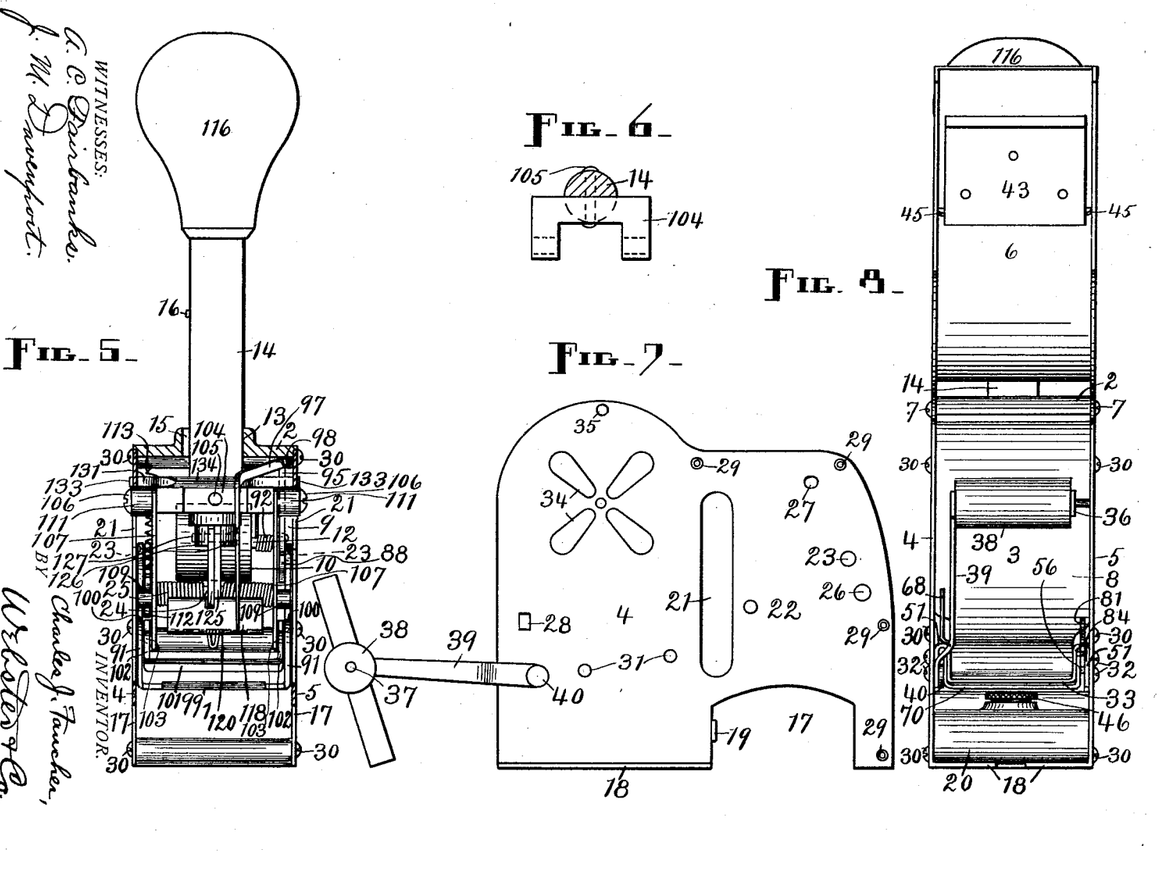
Fig. 5, a transverse vertical section through the affixer, taken through the vertical slots in the front and back plates thereof and just behind the mechanism that is directly operated by the plunger and looking toward the front end of the machine and toward such mechanism and the other members in the front-end portion of the case, the normal positions of the parts and members shown still obtaining.
Fig. 6, a top plan of the plunger cross-head.
Fig. 7, an inside elevation of the front side plate, with the stamp-roll carrier, the latter being turned down into receiving position.
Figure 7:
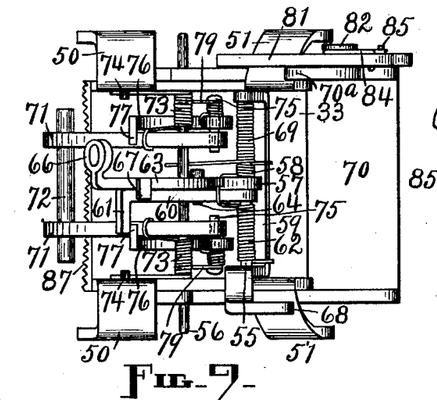

Having special reference to Figs. 2, 5 and 15, it will be seen that the shaft 12 of the counter is provided on its exposed terminal with an angular operating arm 88. This arm is rigidly secured on the shaft 12, and the major portion of the same is behind the vertical plane of said shaft. The arm 88 at its free terminal normally rides on a roll 89 which is mounted on a stud 90 that projects inwardly from the rear arm of a pair designated by the numeral 91. Said arm 88, when free, is forced onto the roll 89 by means of a spring 92 which encircles the shaft 12 and has one terminal bearing against the front end 1 of the case and the other end on the upper edge of the arm. A hook 93 is formed on the free end of the arm 88 above the part that is designed to ride on the roll 89.

Mounted to rock on an inwardly-projecting fixed stud 94, set in the back plate 5, is a detent 95 for the arm 88. The detent 95 depends from the stud or pivot 94 and has a hook 96 at its base arranged to take position in the path of the hook 93 when the arm 88 is occupying an approximately horizontal position, there being, however, enough clearance between the two hooks to enable said detent to swing clear of the arm when occasion requires; and said detent is provided with a long tail-piece 97 that is offset toward the longitudinal center of the machine and sweeps downwardly to the right to have its free terminal inserted in the socket 66, a loose slip connection being thus formed. A spring 98 has one end inserted in or otherwise fastened to the stud 94, is coiled on said stud, and has its opposite end carried over the top of the tail-piece 97 at or adjacent to the junction of said tail-piece with the detent 95 and behind the vertical plane of said stud, and so normally retains said detent with its hook 96 in the path of the hook 93 and the counter-releasing foot 63 with its serrated part 65 in the rearward or operative position, the lug 67 then bearing on the arm 60 and the lug 61 on the front arm 71.

Figure 16:
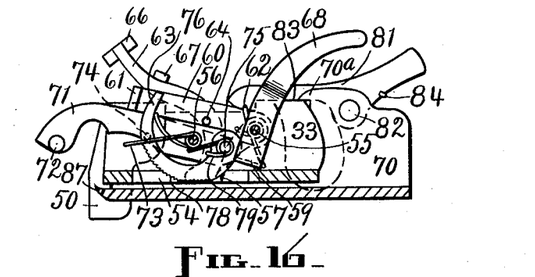
Fig. 16, an enlarged front side elevation of the aforesaid stamp-feed and counter-releasing mechanism, with the hanger and tray in section, showing the operation of the lifter which forms part of such mechanism.

The functions of the combined stamp-feed and counter-releasing mechanisms are thus explained. The lifter 59 is swung forward on the spindle 55, through the medium of the handle 68 and against the resiliency of the spring 69, to raise the sharp end of the finger 57 and the serrated portions of the foot 63 and the jaws 76 upward in the slots 53 and 54 and thus clear the space between the hanger and tray floors for the initial introduction of the stamps. The elevating of the parts first mentioned is effected by reason of the fact that the front edge of the lifter 59, when swung forward, encounters the adjacent edges of the finger 57 and the jaws 76, which swing forward and upward on the spindle 55 and the pivots 75, respectively, and against the resiliency of the springs 58 and 79, respectively, and by reason of the further fact that the front edge of said finger encounters the adjacent edge of the foot 63, which rocks on the pivot 64, against the resiliency of the spring 98, into the desired position. The parts, including those the operation of which has not yet been explained, are now disposed as shown in Fig. 16. Upon the release of the handle 68, the displaced parts are immediately returned to their normal positions by their respective springs, the spring 69 being of sufficient strength to overcome the resistance offered by the springs 58 and 62. When the foot 63 is rocked into the position as represented in Fig. 16, the tail-piece 97 and the detent 95 are actuated with it, rocking on the stud 94, so that the hook 96 is taken out of the path of the hook 93, but at this time such action has no significance, being merely incidental to the operation of the connected parts.

The function of the finger 57 is to prevent backward movement on the part of the stamp strip in the tray 70, which it does because of the shape of said finger and the situation of the sharp end thereof in advance of the vertical plane of the spindle 55, and this without interfering with the forward movement of such strip. The spring 58 serves to keep the finger 57 in operative position, but is light enough not to cause said finger to bear with too much force on the stamps as they advance.

The jaws 76 engage with their serrated edges 78 the stamps in the tray 70 and advance them when the arms 71 are so rocked on the spindle 56 as to elevate the forward ends and depress the rear ends of said jaws, as when the front ends of said arms are raised, because a rolling or sliding motion forward on said tray or a stamp or stamps therein is then imparted to such edges. The jaws 76 slide backward, upon the rocking of the arms 71 in the opposite direction or back to normal position, or the serrated edges 78 slide backward at this time and take position in readiness to further advance the stamps at the subsequent upward tilt of the front terminals of said arms, and it is then that the stop finger 57 becomes effective, since said jaws necessarily drag on the stamps when returning to active position. The springs 79 provide the required amount of force to enable the jaws 76 to properly engage the stamps. The principal office of the lugs 77 is to prevent the jaws 76 from dropping down too far when the tray 70 is removed and so interfering with the replacing of said tray.

The parts are so timed in their respective operations that the counter-releasing mechanism is operated but once for each stamp that passes under the foot 63, or, to state it differently and in more general terms, a stamp is affixed at each complete operation of the machine and such stamp is counted or registered. To prevent registration of the operations of the machine when no stamps are actually affixed or delivered the detent 95 is provided, which detent must be moved away from the arm 88 in order for the act of registration to be performed, and this latter can be done only when a stamp passes forward under the foot 63 and at no other time. The forward passage of a stamp in the tray 70 under the serrated part 65 of the foot 63 actuates such part forward and so rocks said foot on the pivot 64 and throws upward the socket 66, the latter carries with it the tail-piece 97 and thus swings the detent 95, on the stud 94 and against the resiliency of the spring 98, rearwardly, and the hook 96 is withdrawn from the path of the hook 93 and no longer acts in the capacity of an obstacle or obstruction to the operation of the counter 10. The foot 63 is now out of operative position and must be reset, in fact the counter-releasing mechanism as a whole, including the detent 95, must be reset. The resetting of the aforesaid mechanism is effected in this way—after the foot 63 acts to release the counter the arms 71 are elevated at their forward ends, and in changing position the lug 61 is encountered and the arm 60 is rocked upward on the spindle 55 against the resiliency of the spring 62, with the result that the pivot 64 is raised high enough to enable the foot to be returned to operative position by the spring 98 and through the medium of the tail-piece 97. The movement in the opposite direction of the arms 71 leaves the lug 61 behind and the foot bears once more on the bottom of the tray 70, the spring 62, acting through the arm 60 and the pivot 64, holding down said foot. The spring 98 returns the detent 95 to operative position with its hook 96 under the hook 93, and also causes the foot 63 to be swung so that its base is in the backward operative position, as noted, and retains such base in such position until the next stamp is drawn beneath it. The counter-releasing mechanism is most clearly represented in its set condition in Fig. 15.

Passing now to the stamp-transfer mechanism, or the mechanism that tears the stamps, one at a time, from the strip and conveys them to the envelops, and incidentally counts or registers them, it will be observed that the two arms 91 are pivotally mounted at their upper front ends on the studs 23 and are rigidly connected at their opposite ends by a transverse plate 99 which projects beyond the free ends of said arms and constitutes the lower stamp-transfer or gripping jaw of the machine. In each of Figs. 1, 17 and 19, although the front plate 4 has been removed, the stud 23 which is set in said plate is left and shown in section for the sake of clearness in illustrating and describing the mechanism of which it forms a part. Each arm 91 has formed thereon at its free end, but somewhat remote from the adjacent end of the plate or jaw 99, a cam-projection 100. Associated with the jaw 99 is an upper stamp-transfer or gripping jaw 101 having two arms 102 rigidly connected with the ends thereof. The front end of each arm 102, assuming that the parts are in their elevated, initial or starting positions, as will be assumed for the purposes of the present description, is pivoted at 103 to one of the arms 91 inside of the same. A horizontal cross-head 104 is let into the back side of the plunger 14 and there secured by means of a rivet 105 (see Figs. 2, 5 and 6). Having their upper ends pivotally attached at 106—106 to the sides of the cross-head 104 are two links 107. The lower end of each link 107 is pivoted at 108 to one of the arms 102 on the inside and above the rear or gripping edge of the jaw 101, and such link is provided on its opposite face with a roll 109 which is mounted on a pin 110 set in said link above the adjacent pivot 108. The cam-projections 100 are at certain times in the paths of travel of the rolls 109. Rolls 111—111 are mounted on the pivots 106, outside of the links 107, and are located by the cross-head 104 and such pivots within the slots 21 in the front and back plates and travel up and down in such slots when the plunger 14 is reciprocated, thus guiding and steadying said plunger and the parts connected therewith and operated thereby and preventing the plunger from turning on its axis. The jaws 99 and 101 are so constructed that their contiguous surfaces can be brought tightly together, as shown plainly in Fig. 18. The spring 25, which is mounted on the rod 24, has a looped middle portion that extends downwardly and bears against the end 1, and has its free ends extended rearwardly and arranged to bear beneath the pivots 103, is designed to swing the arms 91 upward on their pivots 23 until they contact with the stops 22 which are in the paths of travel of said arms, and elevate the plunger 14, together with all attached parts, and to retain such arms, plunger and parts thus elevated in that condition, and said spring has sufficient power to do this. When the arms 91 are in contact with the stops 22, the back edge of the jaw 99 is in approximately the same horizontal plane with the serrated edge 87 of the trays 70.

A lifter arm 112 is loosely mounted at its front end on the front stud 23, inside of the front arm 91, and bears with its opposite terminal against the adjacent roll 109 from below, being held in contact with said roll by means of a spring 113 which has one end attached at 114 to the end 1 of the case near the top thereof and the opposite end attached to an upwardly-extending projection 115 on said arm. The spring 113 is capable of lifting the links 107 and attached parts still higher, through the medium of the arm 112 which bears beneath the roll 109 on one of such links and which swings upwardly on its stud or pivot 23 under the influence of said spring. As the result of the upward movement imparted to the links by the spring 113 the plunger 14 is raised, through the medium of the pivots 106 and the cross-head 104, to its highest position, and the upper gripping jaw is caused to separate from the lower gripping jaw, since said links are pivoted to the arms 102 and swing the latter upward on their pivots 103. The gripping jaws are thus left wide open. Although the spring 113 may assist the spring 25 in the initial raising of the parts, the real work of said first-mentioned spring does not begin until the work of said second-mentioned spring is finished. Not only are the springs 25 and 92 able to do the work already mentioned, but they have sufficient additional strength to actuate the stamp-feed-operating mechanism and the counter-operating arm, as will appear from the explanation below.

The upper jaw 101 extends under the front end of the stamp-feed-operating member consisting of the arms 71 and the rod 72 and raises such end, said arms rocking on the spindle 56 against the resiliency of the springs 73, when said jaw moves upward under the influence of the springs 25 and 113.

If the detent 95 is out of the way when the arms 91 swing downward, the arm 88 follows down on the roll 89, under the influence of the spring 92, and operates the counter mechanism to register the stamp carried down by the gripping jaws; and when said arms 91 swing upward, under the influence of the spring 25, said arm 88 is rocked upward, against the resiliency of said spring 92, into position to operate said counter mechanism at the next downward sweep of said arms 91.

The plunger 14 is forced downward by hand, and in its descent said plunger first closes the upper jaw 101 onto the lower jaw 99, through the medium of the cross-head 104 and the links 107, then, through the same medium and by reason of the contact of said upper jaw with said lower jaw, forces said jaws downward and forward together, and, finally, through the medium of the rolls 109 which advance onto the cam-projections 100, forces the arms 91 still farther forward and separates said jaw 99 from said jaw 101. The separation of the jaw 99 from the jaw 101 is due to the fact that, at the time the rolls 109 contact with the cam-projections 100, the links 107 have swung forward on their pivots 106 nearly as far as they can go, and can and do exert their force on said cam-projections in a manner, due to the pivotal connections between said links and the arms 102 and the pivotal connection between said arms and the arms 91, which brings about the desired separation of the jaws, the forward movement of the jaw 99 being greater than the little remaining forward movement which may be imparted to the jaw 101. As the jaw 99 is forced forward to the limit of travel in that direction, the arms 102 turn slightly on the pivots 108 as their ends which are pivoted at 103 to the arms 91 move with said last-mentioned arms, and this tilts the jaw 101 backward a little and assists in the separation of the jaws, but the principal factor in such separation is the means which positively acts on said arms 91 to force them forward, while said arms 102 are nearly or quite stationary or at least have little or no forward movement bodily. Meanwhile the arms 71 have with their front ends and the rod 72 and under the influence of the springs 73 followed down on the jaw 101 until said jaw passes away and leaves said rod resting on the moistener 47, and the counter-operating arm 88 has followed down on the roll 89, unless held up by the detent 95.

Upon the release of the plunger 14, the spring 25 immediately acts on the pivots 103 to raise said plunger with the directly and indirectly connected or associated parts, the first result of this being that the rolls 109 pass away from the cam-projections 100 so that the jaws 99 and 101 can close. In swinging rearwardly and upwardly the jaw 101 rises beneath the rod 72 and elevates it with the attached parts of the arms 71, the arm 112 completing this part of the operation; and at the same time the roll 89 returns the arm 88 to its former position, provided said last-mentioned arm followed down on said roll.

For a clear understanding of the upward movement of the plunger and parts, it should be noted that the first effect of the spring 25 is to close the gripping jaws, by that act depressing to a still greater extent the lower terminals of the links 107, with the result that a rigid lifting element is produced which transmits the force of said spring to said links through their lower ends, and causes said links to raise the plunger, the oscillatory members swinging backward and upward with it. The spring 25 must, of course, be powerful enough to start and continue the operation of lifting the parts in question or restoring them to initial position, after the plunger has finished its down stroke and been released, even when not aided by the weight of the case and other inert parts at the time, which lend their assistance when, as is usual, the machine is lifted by the protruding terminal of said plunger at the end of the affixing operation.

The plunger 14 is provided at the top with a handle 116 to afford a convenient grip for the hand of the operator.

A presser for the stamps, after they have been deposited on the envelops, is provided in the form of a device which resembles a leaf hinge in that it consists of two interlocking plates 117 and 118 pivotally connected by a pin 119. The plates thus united are cut out in the center of their interlocking portions to admit the coil of a spring 120 on the pin 119. The straight branches of the spring 120 are arranged above the plates 117 and 118 and have their ends in engagement with pins 121 and 122, the former being held in place parallel with the pin 119 by two brackets 123 secured to the upper side of the plate 117, and the latter being received in a roll 124 which forms the back longitudinal edge of the plate 118. By this arrangement the spring 120 exerts a tendency to close the pressure plates upon each other. Two arms or links 125 have their lower ends pivotally mounted on the pins 121 and 122 and their upper ends pivotally attached to and between twin lugs 126, which depend from the bottom of the plunger 14, by means of a pin 127. The links 125 have oppositely-directed beak-like projections 128—128 at the top which are adapted to strike against the bottom of the plunger 14 and so limit the amount of inward swing of said links and of closing action of the plates 117 and 118, produced by the spring 120. Normally the upper edges of the projections 128 are in contact throughout with the bottom of the plunger, this being while the presser plates stand at an obtuse angle to each other or are in their so-called closed position or condition. When thus contracted the presser is able to pass freely up and down between the gripping-jaw arms and other adjacent members.

Figure 13:
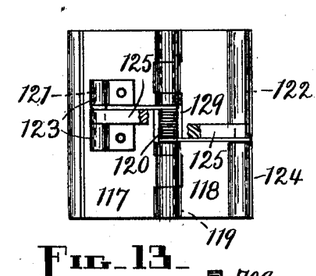
Fig. 13, an enlarged top plan of the stamp presser.
Figure 14:
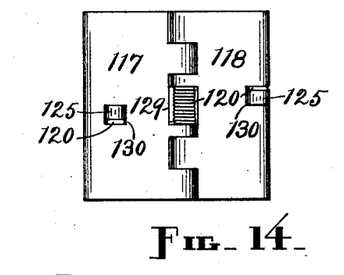
Fig. 14, an enlarged bottom plan of said presser.

The opening for the coil of the spring 120 appears at 129, and there are openings 130—130 in the presser plates for the bases of the links 125 (see Figs. 13 and 14), but the bottom ends of said links do not extend below the under or working faces of said plates.

The presser is arranged transversely in the machine, that is to say, the axial center of said presser is parallel with the gripping jaws. When the presser is depressed by the plunger 14, its apex strikes first, and then, as said plunger continues to descend, the links 125 swing away from each other at their bases, turning on the pin 127 and drawing the projections 128 away from the bottom of said plunger, and force the plates 117 and 118, against the resiliency of the spring 120, down flat onto the same horizontal plane upon which said apex first comes to rest. The result of this operation, when there is a stamp under presser, is to press said stamp firmly against the envelop through the longitudinal center of the stamp, and then to press the remaining portions of the stamp into place, at the same time squeezing the moisture on the stamp out under the left-hand edge which was in the grasp of the gripping jaws and so prevented from being moistened before. This unmoistened portion of the stamp is but a small fraction of an inch, not enough to escape wetting under the action of the presser. The presser is contracted by the spring 120 upon the ascent of the plunger.

Taking up, finally, the stop or check device for the plunger 14, by means of which said plunger, after being started in either direction, is prevented from being impelled in a contrary direction until the full stroke is made, attention is directed to an oscillatory lock-plate, gripper or clutch 131. This clutch has an opening 132 therethrough for the passage of the plunger, is arranged transversely in the case, and has trunnions 133—133 at the front ends of its lateral edges, which trunnions are journaled in the elongated openings 27 in the plates 4 and 5 of said case. The straight part of the back edge of the clutch 131 is beveled horizontally in both directions to form a double bearing 134. A flat spring 135 is secured at the base to the front side of the partition 3, and has a forwardly-extending angular head 136 at the top to engage the bearing 134. The pin 16 is above and the cross-head 104 below the clutch 131; and the arrangement of parts is such that said pin encounters said clutch from above, just before the plunger arrives at the end of its down stroke, turns said clutch downward, and forces the bearing 134 below the head 136 of the spring 135, or below the apex of said head, by the time said plunger completes said stroke, which is when the presser plates 117 and 118 are laid flat on the same plane with the bottom of the case; and said cross-head encounters said clutch from below, just before said plunger arrives at the end of the up stroke, turns said clutch upward, and forces said bearing above said apex of the spring, by the time the plunger completes said last-mentioned stroke. The pin 16 travels up and down through the vertical slot 15 in the top of the case. The trunnions 133 turn freely in the openings 27 when the clutch is shifted in either direction, and the head 136 of the spring 135 retains said clutch, by reason of the engagement of said head with one beveled face or the other of the bearing 134, at either an upward or a downward inclination, excepting when overcome by the force transmitted through the pin 16 or the cross-head 104. The action of the spring 113 is responsible for the shifting of the clutch from the downward to the upward inclination, or vice versa, or rather is responsible for retaining said clutch in place after being shifted. The diameter of the opening 132 is slightly larger than that of the plunger 14, and the edge of such opening is preferably rounded, as best shown in Fig. 2. The elongated openings 27 afford what little forward and backward play is required when the clutch is shifted from one position to the other.

From the foregoing it is plainly to be seen that, when the clutch 131 is arranged at an upward incline, there is sufficient looseness of the parts, afforded by the openings 27 and the spring 135, to allow the plunger to travel downward freely, but that the instant said plunger starts to rise it is gripped firmly by said clutch and checked before any upward movement takes place, the frictional engagement between the clutch and the plunger being great enough to accomplish this end; and that, on the other hand, when said clutch is arranged at a downward incline, said plunger can travel upward freely, but cannot be moved down, the same causes operating in this as in the first instance. The upward movement of the plunger is fixed by the clutch when cramped into gripping relation with the plunger by the ascending cross-head, and the descending pin 16 would cause said clutch to grip and stop said plunger at the end of the downward travel of the latter, if the presser did not do so.

It is very apparent that some arrangement, such as the lock or clutch just described, is needed to prevent retrograde movement of the plunger and attached or connected parts, after starting from either end of their travel and before arriving at the opposite end of their travel, because without such provision the stamps would be torn and the mechanism very likely would be injured. With this locking device no false movement of the mechanism is possible.

Figures 17, 18, 19:
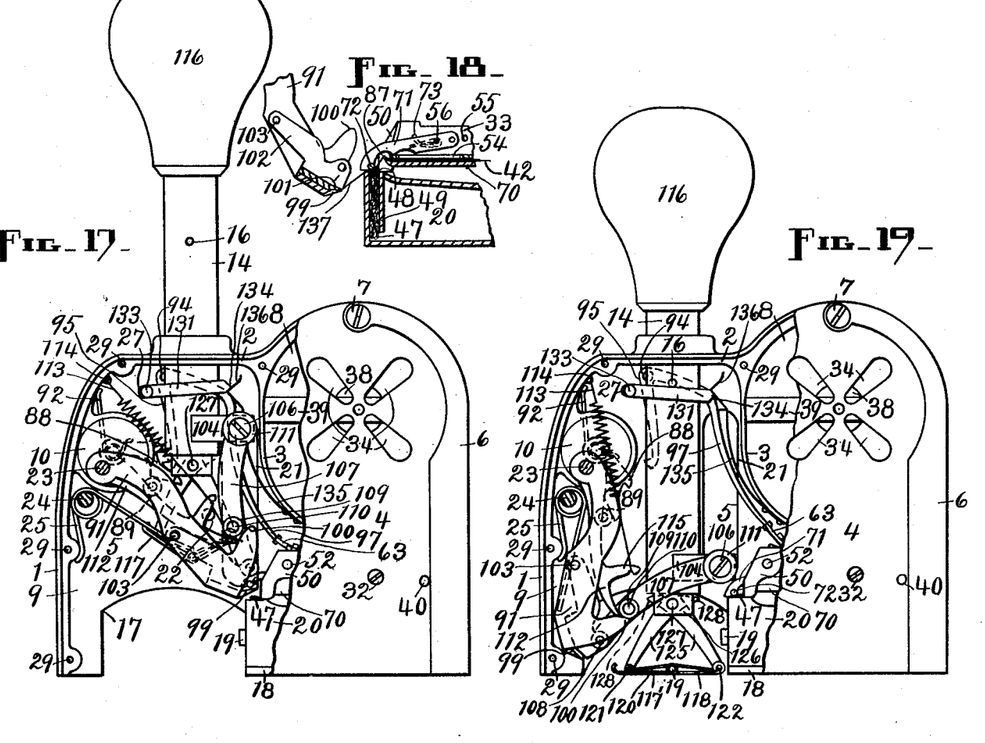
Fig. 17 an elevation similar to Fig. 1, but showing the stamp-gripping jaws partially depressed and closed.
Fig. 18, a fragmentary detail, in section, showing said jaws still further depressed and illustrating the manner in which they draw the stamp from the tray and over the moistener, preparatory to depositing it upon an envelop.
Fig. 19, still another elevation similar to the first view, but here showing the parts and members as they appear at the end of the downward stroke of the plunger in the final affixing act, and, Fig. 20, an enlarged front end elevation of the tray.

A brief explanation of the operation of the machine as a whole is all that appears to be necessary, in view of the preceding description of the parts and explanation of their operations, and this is as follows: In the first place the door 6 is unlocked and opened, the arm 39 is turned down, the stamp roll 41 is slipped onto the roller 38, and the loose end of the stamp strip 42 is led from the top of said roll to the floor of the tray 70 and pushed along said floor and into and through the space between said floor and the floor of the hanger 33 until a narrow portion of such end projects onto the working edge of the lower jaw 99, the handle 68 having meanwhile been pressed down to remove with the lifter 59 the sharp end of the finger 57 and the serrated parts of the foot 63 and the jaws 76 from said space. As soon as the stamp strip is thus placed, the handle 68 is released and the aforesaid finger, foot and jaws permitted to swing down on to said strip, the engagement being with the ungummed surface of the strip which is uppermost. In order that the ungummed surface of the stamp strip shall be uppermost in the tray 70, care must be taken to place the stamp roll on the roller 38 in such a way that the strip passes off from the top of said roll, instead of from the bottom, at this time. Next the arm 39 is turned back into the case. The door 6 is now closed and locked, and the machine is ready to commence operations, it being assumed that the reservoir 20 has been filled and placed in position, and understood that the stamp strip 42 extends downward from the stamp roll 41 and behind the base of the partition 3 to the feed mechanism. The several mechanisms are at this time initially disposed, as represented in Figs. 1, 2, 5 and 15, and when the machine is placed in position with the axis of the plunger 14 over the point on an envelop where it is desired to deposit a stamp said plunger is forced down to its full extent. The following operations occur during the descent of the plunger. The upper jaw 101 is closed onto the lower jaw 99 and the advance edge of the first stamp in the strip is tightly gripped between said jaws, and the rod 72 is lowered onto the moistener 47 and onto said stamp which is between said moistener and said rod (see Figs. 11 and 17); said stamp is drawn by said jaws, as they continue to descend, forward over said moistener and downward, as indicated in Fig. 18 wherein said stamp is represented at 137, and said strip moves with said stamp until the perforated portion between the first and second stamps reaches the serrated edge 87 of the tray 70 when said first stamp is torn from the remainder of the strip; and the stamp thus severed from its companions is carried by said jaws beneath the descending presser, is pinned down, as it were, by said presser and at the same instant is released from the gripping jaws, and finally is compressed throughout its entire area by the spread presser plates (see Fig. 19). As the stamp 137 moves forward it actuates the foot 63, which is resting on said stamp, to withdraw the detent 95 from the path of the arm 88, and the counter is operated to register the stamp. Another action that occurs as one of the results of the descent of the plunger is the backward setting of the stamp-feed jaws 76 to bring them into position to further advance the strip 42, the finger 57 preventing said strip from being carried backward with said jaws at this time. After thus affixing the stamp pressure from above on the plunger 14 is removed and said plunger permitted to ascend or to return to initial position, the clutch 131 having shifted to release said plunger for its upward travel. While the plunger is rising the operations which previously occurred are practically reversed, that is to say, the bottom gripping jaw closes on the upper gripping jaw and remains so disposed until said bottom jaw arrives at stamp-receiving position adjacent to the moistener, when said upper jaw moves away from the lower one, and the presser closes or contracts and is drawn up out of the way of the other stamp-handling members in the compartment 9. As the gripping jaw 101 approaches the end of its upward movement said jaw encounters the arms 71 and tilts them, with the result that the foot 63 is reset and the detent 96 swung into operative relation again to the arm 88 which is by this time in its elevated position, and with the further result that the jaws 76 are rolled or pushed forward and in turn push the second stamp which is now the leading stamp out over the jaw 99 waiting to receive it. The clutch 131 is shifted once more, this time to release the plunger for downward movement, and all is at last in readiness for a repetition of the feeding, counting, and other operations which combine with the affixing operation proper to produce the complete operation of the machine.

Not only does the rod 72 hold the stamp down on the moistener, but it also takes out the "curl" which is frequently present, especially in the stamps that come from the inner convolutions of the roll 41. Said rod straightens the stamp by causing it to describe a reverse curve as it is drawn from the front edge of the tray under the rod by the gripping jaws.

Although the feeding jaws 76 are not held down by the springs 79 with sufficient force to injure the stamps as the latter are intermittently drawn through the tray by the gripping jaws, they do hold said stamps down so as to insure the catching on the points at 87 of the perforated parts of the stamps or of the strip and the severing of the strip or separating of the stamps at such points.

It may be well to note that the gripping jaws in descending sweep forward and pass under and out of the way of the presser, which they can then do because of the contracted condition of said presser, before the latter descends low enough to encounter said jaws, and conversely said presser rises and contracts in time to avoid said jaws when they return to initial position.

What I claim as my invention, and desire to secure by Letters Patent, is—

1. Mechanism of the class described, comprising a reciprocable plunger, coöperating oscillatory gripping jaws operatively connected with said plunger, and feeding-mechanism separate from said plunger and jaws, but having an actuating part which extends into the path of one of said jaws.

2. Mechanism, of the class described, comprising a reciprocable plunger, coöperating oscillatory gripping jaws operatively connected with said plunger, and feeding mechanism having a part in the path of one of said jaws and being so dependent for action on the gripping-jaw mechanism.

3. Feeding mechanism, for flexible units from a perforated strip, comprising means adapted to engage the perforated parts of the strip and hold the latter while the foremost unit is being detached, and oscillatory means to grip such foremost unit, draw said strip forward, and tear off said unit when the first line of perforations arrives at said holding means.

4. Feeding mechanism, for flexible units from a perforated strip, comprising advancing mechanism for the strip, holding means for said strip, such means being adapted to engage the perforated parts of said strip, gripping jaws adapted to seize the foremost unit on both sides adjacent to its front edge and tear said unit from said strip.

5. A suitable supporting frame for feeding mechanism, a plunger for such mechanism mounted to reciprocate in said frame, and a vibratory lock or check encircling and frictionally engaging and arranged to prevent retrograde movement on the part of said plunger between the ends of its stroke.

6. The combination, in feeding mechanism for flexible units from a perforated strip, with a reciprocable plunger, of oscillatory means to grip and detach a unit from the strip at each downward stroke of said plunger, and oscillatory and frictionally engaging means to advance another unit to gripping position at each return stroke of said plunger.

7. Feeding mechanism, for flexible units from a perforated strip, comprising a suitable supporting frame, a plunger mounted to reciprocate therein, means to hold said strip by the perforated portions thereof, coöperating spring-pressed gripping jaws mounted to oscillate in said frame and operatively connected with said plunger, said jaws being adapted to seize the foremost unit and tear it from said strip, and strip or unit-feeding mechanism within said frame and operated by the gripping-jaw mechanism.

8. Feeding mechanism, for flexible units from a strip, comprising a suitable supporting frame, a plunger mounted to reciprocate therein, a lock arranged to prevent retrograde movement on the part of said plunger between the ends of its travel, coöperating spring-pressed gripping jaws mounted to oscillate in said frame and operatively connected with said plunger, and strip- or unit-feeding mechanism within said frame and operated by the gripping-jaw mechanism.

9. Feeding mechanism, for flexible units from a strip, comprising a suitable supporting frame, a plunger mounted to reciprocate in said frame, coöperating spring-pressed gripping jaws mounted to oscillate in said frame and operatively connected with said plunger, and strip- or unit-feeding mechanism within said frame and independent but having a part extending into the path of one of said jaws and thus operated by the gripping-jaw mechanism.

10. Feeding mechanism, for flexible units from a perforated strip, comprising a suitable supporting frame, a plunger mounted to reciprocate therein, coöperating spring-pressed gripping jaws mounted to oscillate in said frame and operatively connected with said plunger, oscillatory and frictionally-engaging strip- or unit-feeding mechanism within said frame and independent but having a part extending into the path of one of said jaws and thus operated by the gripping-jaw mechanism, and means to cause each leading unit to be separated from the following unit or units.

11. The combination, in feeding mechanism for flexible units from a strip, with a suitable supporting frame, a hanger secured in said frame, such hanger having a slotted floor, and mechanism mounted in said hanger and having parts which operate in the slots in the floor thereof, of a tray supported from said hanger and arranged with its floor under said first-mentioned floor and separated therefrom to form a passageway for the unit strip.

12. The combination, in feeding mechanism for flexible units from a strip, with a suitable supporting frame, a hanger secured in said frame, such hanger having a slotted floor, and mechanism mounted in said hanger and having parts which operate in the slot in the floor thereof, of a tray arranged with its floor under said first-mentioned floor and separated therefrom to form a passageway for the unit strip, and means thus to support said tray from said hanger and permit the former to be removed from the latter.

13. The combination, in feeding mechanism for flexible units from a strip, with a suitable supporting frame, a hanger secured in said frame, such hanger having a slotted floor and a lateral projection, and mechanism mounted in said hanger and having parts which operate in the slots in the floor thereof and parts which project beyond the sides thereof, of a tray recessed to receive and be supported by said projecting parts of said mechanism, and provided with a latch adapted to engage said lateral projection and afford additional support for said tray, the latter being thus held with its floor under said first-mentioned floor and separated therefrom to form a passage for the unit strip.

14. In feeding mechanism for flexible units from a strip, strip-feeding mechanism comprising, with members arranged to form a passageway for the strip, engaging means comprising a jaw extending into said passageway to advance the strip intermittently, such jaw having an arcuate strip-engaging edge which is in said passageway, and an oscillatory arm with which the rear end of said jaw is pivotally connected.

15. In feeding mechanism for flexible units from a strip, strip-feeding mechanism comprising, with members arranged to form a passageway for the strip, a spring-pressed oscillatory finger extending into said passageway for such strip to prevent backward movement of the same, and a curved jaw also extending into said passageway for such strip to advance the latter intermittently, and a rocking arm having said jaw pivotally connected at its rear end therewith.

16. In feeding mechanism for flexible units from a strip, strip-feeding mechanism comprising, with members arranged to form a passageway for the strip, engaging means extending into said passageway for said strip to prevent backward movement of the same or a unit thereof, engaging means extending into said passageway for such strip to advance the latter or a unit thereof, and manually-operated means to remove such first- and second-mentioned means from such passageway and restore them to such passageway again.

17. In feeding mechanism for flexible units from a strip, strip-feeding and counter-releasing mechanism comprising, with members arranged to form a passageway for the strip, engaging means extending into said passageway for such strip to prevent backward movement of the same or a unit thereof, engaging means extending into said passageway for such strip to advance the latter or a unit thereof, means extending into said passageway to be engaged and operated by said strip or a unit thereof when it moves forward, and manually-operated means to remove the members which extend into said passageway from the same and to restore them thereto.

18. The combination, in mechanism of the class described, with a suitably-mounted, spring-pressed manually-operated lifter, of a suitably-mounted feeding jaw located in the path of said lifter when operated against the force of its spring.

19. The combination, in mechanism of the class described, with a suitably-mounted spring-pressed lifter, of a suitably mounted stop finger and feeding jaw both located in the path of said lifter when operated against the force of its spring.

20. The combination, in mechanism of the class described, with a suitably-mounted spring-pressed lifter, of a stop finger and feeding jaws located in the path of said lifter when operated against the force of its spring.

21. The combination, in mechanism of the class described, with passageway-forming members, of a spring-pressed rocking member provided with swinging feeding jaws which operate in the passageway formed by said first-mentioned members, and a rocking arm having a part which extends into the path of said first-mentioned rocking member.

22. A feeding device, for mechanism of the class described, comprising a suitably-supported axial member, arms mounted to rock intermediate of their ends thereon, and curved jaws pivotally mounted at their rear ends on said arms behind said axial member.

23. In mechanism of the class described, passageway-forming members comprising a hanger and a tray, the latter being provided at the front end of the floor thereof and of the passageway formed by said members, to hold back an advancing perforated strip as the perforated portions arrive at such teeth, and spring-pressed members normally engaging at such times such strip in said passageway.

24. The combination, in mechanism of the class described, with passageway-forming members provided at the outlet end of the passageway formed thereby with means to hold back an advancing perforated strip as the perforated portions of the same arrive at such end, of gripping jaws capable of grasping and drawing forward such strip and severing the leading portions thereof, one after another, as said perforated portions become engaged by such holding means.

25. Feeding mechanism, for flexible units from a strip, provided with combined rocking and sliding strip-feeding means, and further provided with oscillatory strip-drawing and unit-severing and transferring means.

26. The combination, in feeding mechanism of the class described, with spring-pressed arms and a rod connecting the front terminals of said arms, of feeding jaws pivotally connected with the rear terminals of said arms.

27. The combination, in mechanism of the class described, with a supporting member for a strip, such member being provided at the front end with a severing edge for said strip, of spring-pressed rocking arms and a rod connecting the front terminals of said arms, and gripping means for the forward end of such strip, said front terminals of such arms being in the path of such gripping means and adapted with said rod to descend, when said gripping means passes away from them, and to cause said strip to be drawn at an angle over said severing edge.

28. The combination, in mechanism of the class described, with a suitable supporting frame, and a reciprocable plunger mounted to operate in said frame, of a lower gripping jaw having arms pivotally attached to said frame and spring-pressed in one direction, an upper gripping jaw having arms pivotally attached to said first-mentioned arms, said upper jaw arms being operatively connected with said plunger, and means to separate said jaws at each end of their travel.

29. The combination, in mechanism of the class described, with a suitable supporting frame, and a reciprocable plunger mounted to operate in said frame, of a lower gripping jaw having arms pivotally attached to said frame and spring-pressed in one direction, an upper gripping jaw having arms pivotally attached to said first-mentioned arms, said upper jaw being operatively connected with said plunger, and positively-acting means to force said lower jaw away from said upper jaw as said plunger approaches the end of its down stroke.

30. The combination, in mechanism of the class described, with a suitable supporting frame, and a reciprocable plunger mounted to operate in said frame, of a lower gripping jaw having arms pivotally attached to said frame and spring-pressed in one direction, means to limit the upward movement of said arms, an upper gripping jaw having arms pivotally attached to said first-mentioned arms, said upper jaw being operatively connected with said plunger, and spring-actuated means to move said upper jaw away from said lower jaw when said plunger approaches the end of its up stroke.

31. The combination, in mechanism of the class described, with a suitable supporting frame, and a reciprocable plunger provided with a cross-head, such plunger being mounted to operate in said frame, of a lower gripping jaw having arms pivotally attached to said frame and spring-pressed in one direction, said arms being provided with cam-projections, an upper gripping jaw having arms pivotally attached to said first-mentioned arms, links pivotally connecting said cross-head and said upper jaw arms, projecting members on said links adapted to contact with said cam-projections, as said plunger approaches the end of its down stroke, to force said lower jaw away from said upper jaw, a lifter arm pivotally mounted in said frame and spring-pressed in one direction, said lifter arm being arranged to engage one of said link projecting members to force said upper jaw away from said lower jaw as said plunger approaches the end of its up stroke, and means to limit the upward movement of said lower jaw arms.

32. The combination, in mechanism of the class described, with a case having vertical slots in the sides, a reciprocable plunger provided with a cross-head, and members on said cross-head extending into and operating in said slots, of a lower gripping jaw having arms pivotally attached to said case and spring-pressed in one direction, an upper jaw having arms pivotally attached to said first-mentioned arms, and links pivotally connecting said cross-head and said upper jaw arms.

33. The combination, in mechanism of the class described, with a suitable supporting frame provided with stops, of a reciprocable plunger provided with cross-head, a lower gripping jaw having arms pivotally attached to said frame, said stops being in the paths of travel of said arms, resilient means adapted to urge said arms toward said stops, an upper jaw having arms pivotally attached to said first-mentioned arms, and links pivotally connecting said cross-head and said upper jaw arms 34. The combination, with a suitable supporting frame, of a reciprocable plunger mounted to operate in said frame, and means to lock said plunger against retrograde movement between the ends of its travel, such means comprising a vibratory member mounted in said frame and encircling and frictionally engaging said plunger, and yielding means to retain said member in either of its two normal positions.

35. The combination, with a suitable supporting frame, and a reciprocable plunger mounted to operate in said frame and provided with projecting members, of a clutch pivotally mounted in said frame and encircling and frictionally engaging said plunger between said projecting members, and yielding means to retain said clutch in either of its two normal positions, said projecting members being arranged to change the position of said clutch when said plunger arrives at the ends of its travel.

36. The combination, in feeding mechanism for flexible units from a rolled strip, of passageway-forming members for the strip, retarding means for such strip, gripping means adjacent to the exit end of the passageway formed by said members, such gripping means being adapted to grasp such strip and draw it forward, and unit-straightening means arranged to engage that part of the strip that is between said exit end of said passageway and said gripping means and curve such part in a reverse direction to that given it in rolling.

CHARLES J. FANCHER.

Witnesses:
F. A. CUTTER,
A. C. FAIRBANKS.

Copies of this patent may be obtained for five cents each, by addressing the "Commissioner of Patents, Washington, D. C."